US011329853B2

(12) United States Patent
Sahraei et al.

(10) Patent No.: US 11,329,853 B2
(45) Date of Patent: May 10, 2022

(54) TONE RESERVATION FOR PEAK TO AVERAGE POWER RATIO REDUCTION

(71) Applicant: QUALCOMM Incorporated, San Diego, CA (US)

(72) Inventors: Saeid Sahraei, San Diego, CA (US); Gokul Sridharan, Sunnyvale, CA (US); Hung Dinh Ly, San Diego, CA (US); June Namgoong, San Diego, CA (US); Krishna Kiran Mukkavilli, San Diego, CA (US); Naga Bhushan, San Diego, CA (US); Tingfang Ji, San Diego, CA (US); Peter Gaal, San Diego, CA (US); Taesang Yoo, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/306,762

(22) Filed: May 3, 2021

(65) Prior Publication Data

US 2021/0344537 A1 Nov. 4, 2021

Related U.S. Application Data

(60) Provisional application No. 63/019,806, filed on May 4, 2020.

(51) Int. Cl.
*H04L 27/26* (2006.01)

(52) U.S. Cl.
CPC ........ *H04L 27/262* (2013.01); *H04L 27/2602* (2013.01); *H04L 27/2615* (2013.01); *H04L 27/2621* (2013.01)

(58) Field of Classification Search
CPC ............. H04L 27/2602; H04L 27/2615; H04L 27/2618; H04L 27/262; H04L 27/2621;
(Continued)

(56) References Cited

U.S. PATENT DOCUMENTS

2007/0242598 A1 10/2007 Kowalski
2008/0298490 A1* 12/2008 Yun ..................... H04L 27/2618
 375/260
2010/0080113 A1 4/2010 Yang et al.

OTHER PUBLICATIONS

International Search Report and Written Opinion—PCT/US2021/030701—ISA/EPO—dated Jul. 30, 2021.

* cited by examiner

*Primary Examiner* — David S Huang
(74) *Attorney, Agent, or Firm* — Harrity & Harrity, LLP

(57) ABSTRACT

Various aspects of the present disclosure generally relate to wireless communication. In some aspects, a user equipment may receive a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and transmit a data transmission using a waveform based at least in part on the resource allocation. Numerous other aspects are provided.

30 Claims, 5 Drawing Sheets

(58) Field of Classification Search
CPC ... H04L 5/0007; H04L 27/2614; H04L 5/001; H04L 5/0048; H04L 5/0094
See application file for complete search history.

TONE RESERVATION FOR PEAK TO AVERAGE POWER RATIO REDUCTION

CROSS-REFERENCE TO RELATED APPLICATION

This Patent Application claims priority to U.S. Provisional Patent Application No. 63/019,806, filed on May 4, 2020, entitled "TONE RESERVATION FOR PEAK TO AVERAGE POWER RATIO REDUCTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for tone reservation for peak to average power ratio reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and transmitting a data transmission using a waveform based at least in part on the resource allocation.

In some aspects, a method of wireless communication, performed by a base station, may include transmitting a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and receiving a data transmission comprising a waveform based at least in part on the resource allocation.

In some aspects, a UE for wireless communication may include memory; one or more processors operatively coupled to the memory; and instructions stored in the memory. The instructions in the memory may be operable, when executed by the one or more processors, to cause the UE to receive a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and transmit a data transmission using a waveform based at least in part on the resource allocation.

In some aspects, a base station for wireless communication may include memory; one or more processors operatively coupled to the memory; and instructions stored in the memory. The instructions in the memory may be operable, when executed by the one or more processors, to cause the base station to transmit a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and receive a data transmission comprising a waveform based at least in part on the resource allocation.

In some aspects, a non-transitory computer-readable medium may store one or more instructions for wireless communication that, when executed by one or more processors of a UE, may cause the UE to receive a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and transmit a data transmission using a waveform based at least in part on the resource allocation.

In some aspects, a non-transitory computer-readable medium may store one or more instructions for wireless communication that, when executed by one or more processors of a base station, may cause the base station to transmit a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and receive a data transmission comprising a waveform based at least in part on the resource allocation.

In some aspects, an apparatus for wireless communication may include means for receiving a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and means for transmitting a data transmission using a waveform based at least in part on the resource allocation.

In some aspects, an apparatus for wireless communication may include means for transmitting a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and means for receiving a data transmission comprising a waveform based at least in part on the resource allocation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
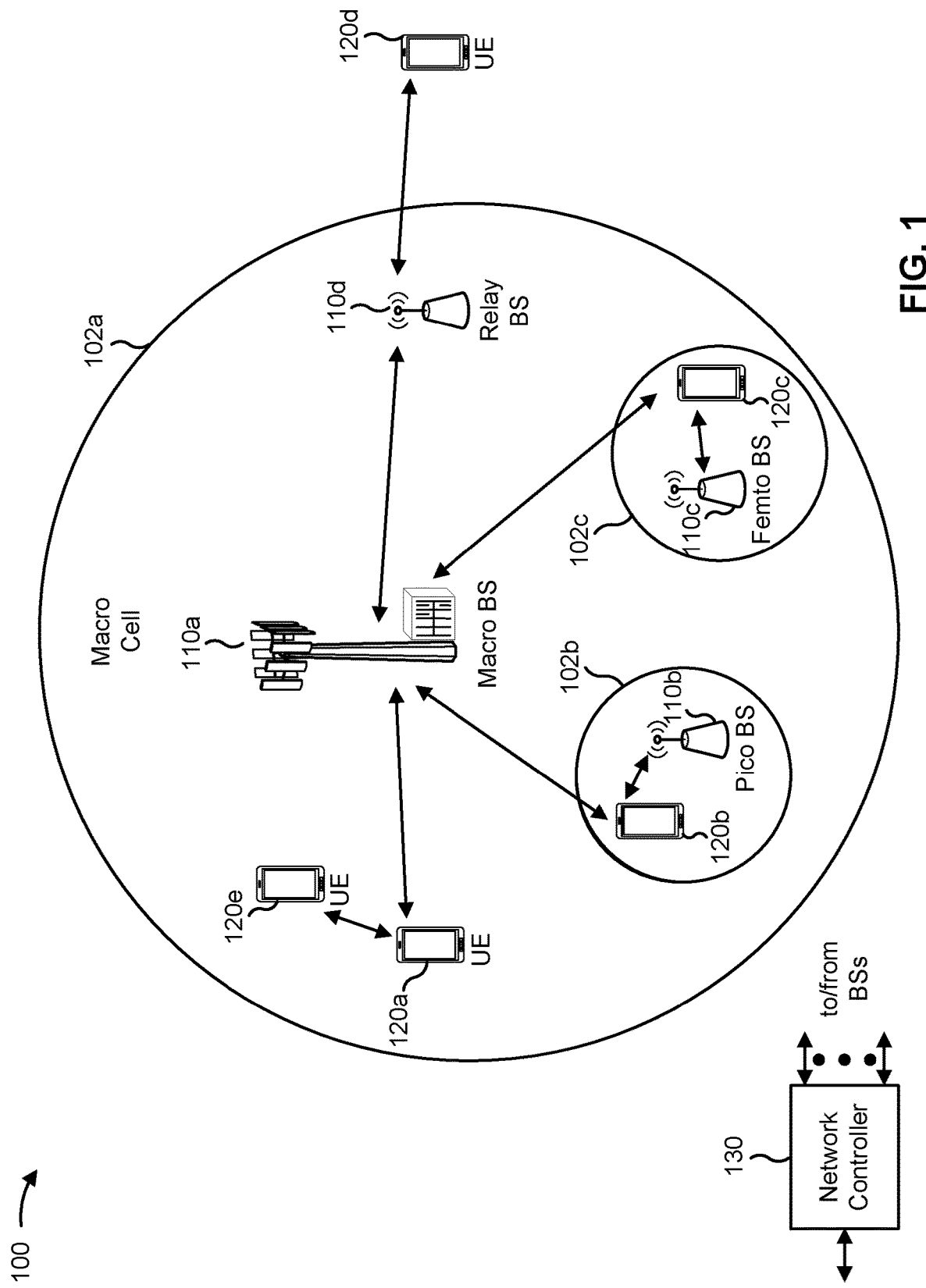
FIG. 1 is a diagram illustrating an example of a wireless network, in accordance with the present disclosure.

Typical methods for peak reduction tone (PRT) selection for reducing peak to average power ratio (PAPR) in a power amplifier of a user equipment (UE) using an orthogonal frequency division multiplexing (OFDM) signal may introduce unnecessary processing that may create a reduction in performance. Additionally, the selection of the PRTs may not be known by the base station, and thus would need to be signaled to the base station to facilitate decoding by the base station, thereby increasing signaling overhead. Aspects of techniques and apparatuses described herein may facilitate PRT reservation for reducing PAPR of a power amplifier in a UE. In some aspects, tone reservation techniques described herein may facilitate PRT location determination based on established patterns, sequences, tables, and/or the like. In some aspects, a PRT subsequence of a universal PRT sequence may be associated with an allocated bandwidth. The UE may use the PRT subsequence and/or the PRTs from the remainder of the PRT sequence. A base station may indicate the PRT sequence to the UE. In this way, PRT location may be determined without optimizing random PRT index selection in real time, thereby reducing the complexity of the transmitter's operation. This may facilitate savings in power and time during transmission, thereby improving performance, reducing computational burden, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
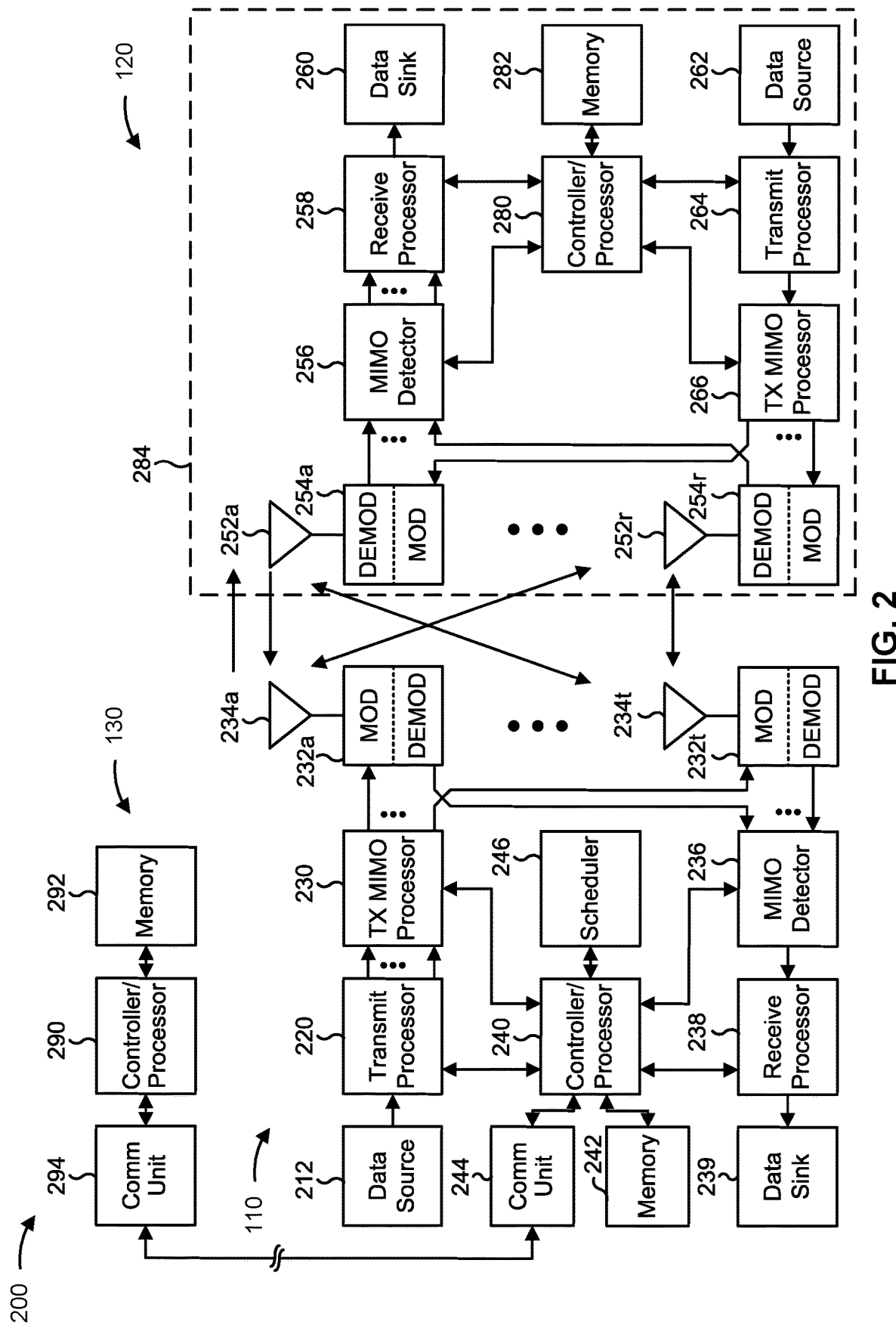
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with tone reservation for peak to average power ratio (PAPR) reduction, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

Figure 4:
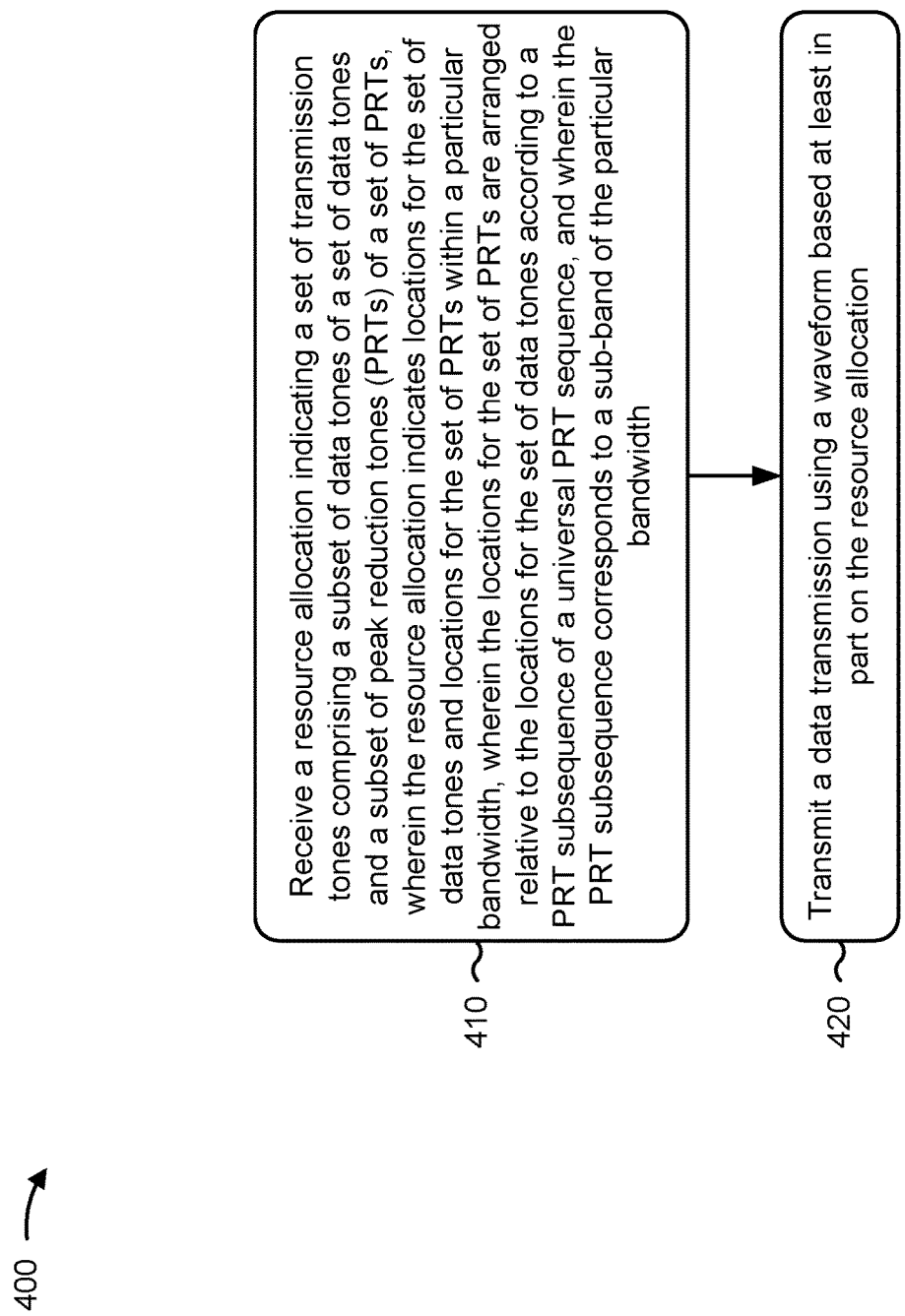
FIG. 4 is a diagram illustrating an example process performed, for example, by a user equipment, in accordance with the present disclosure.

The stored program codes, when executed by processor 280 and/or other processors and modules at UE 120, may cause the UE 120 to perform operations described with respect to process 400 of FIG. 4 and/or other processes as described herein. The stored program codes, when executed by processor 240 and/or other processors and modules at base station 110, may cause the base station 110 to perform operations described with respect to process 500 of FIG. 5 and/or other processes as described herein. A scheduler 246 may schedule UEs for data transmission on the downlink and/or uplink.

In some aspects, UE 120 may include means for receiving a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth, means for transmitting a data transmission using a waveform based at least in part on the resource allocation, and/or the like. In some aspects, such means may include one or more components of UE 120 described in connection with FIG. 2.

In some aspects, base station 110 may include means for transmitting a resource allocation indicating a plurality of transmission tones comprising a subset of data tones of a plurality of data tones and a subset of PRTs of a plurality of PRTs, wherein the resource allocation indicates a plurality of data tone locations within a particular bandwidth, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth, means for receiving a data transmission comprising a waveform based at least in part on the resource allocation, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Commercial power amplifiers typically have a non-linear behavior if operated at high input power. This non-linearity may result in in-band and out-of-band distortion of the signal, and degraded error vector magnitude (EVM) at a receiver of the signal. To avoid non-linearity, the power amplifier may be operated at a mean input power that is several dB lower than the saturation point. An appropriate power level may be determined by determining an input power that maintains a peak to average power ratio (PAPR) of the signal below a certain level.

Orthogonal frequency division multiplexing (OFDM) signals are known to suffer from significant PAPR that grows rapidly by the size of the frequency block. 5G NR is being developed to support higher data rates than LTE. Thus, 5G NR OFDM block sizes may be larger than LTE block sizes, thereby further increasing PAPR of signals. Some PAPR reduction techniques may be data-dependent and computationally expensive, making them unfit for a real-time implementation in the context of a 5G NR transmitter. As a result, clipping and filtering (CF) is often used in the industry. CF results in in-band distortion and often does not converge to a desirable solution.

5G NR provides an abundance of bandwidth both in the uplink and downlink. This is true both due to the addition of Frequency Range 2 (FR2) in 5G NR as well as an increase in the available bandwidth to 100 MHz in the Sub-6 GHz frequency range. This excess bandwidth is partially exploited by using longer OFDM symbols, which further increases the PAPR for OFDM. The excess bandwidth may also be exploited for PAPR reduction via a technique known as tone reservation.

Tone reservation may allow a transmitter to utilize some of the otherwise-idle tones for reducing the PAPR of an OFDM signal. The magnitude and the phase of the reserved tones may be optimized for a given OFDM symbol to minimize the PAPR of the associated signal. In some cases, there may be no overlap between the data tones and reserved tones. In this way, tone reservation may be used without introducing any EVM or adjacent channel leakage ratio. The receiver may simply ignore the portion of the signal associated with the reserved tones and only decode the portion of the signal associated with the data tones.

Tone reservation may be performed by determining PRTs that are configured to reduce peaks of the resulting OFDM signal so that the PAPR of the resulting signal satisfies a threshold. PRTs may be generated using a signal to clipping noise ratio tone reservation (SCR-TR) algorithm. The SCR-TR algorithm may be used to optimize the value of PRT tones based at least in part on their locations.

A UE may be allocated a plurality of N transmission tones having a corresponding plurality of tone location indices, $\{1, \ldots, N\}$. If $\Phi$ is a subset of $\{1, \ldots, N\}$ corresponding to the PRT locations, the remaining transmission tone locations may be allocated to data tones, having a subset, $\{1, \ldots, N\} \backslash \Phi$, of tone location indices. A frequency domain kernel, $P_i$, may be constructed such that:

$$P_i = \begin{cases} 1 & \text{if } i \in \Phi \\ 0 & \text{if } i \in [N] \backslash \Phi \end{cases}$$

and p=iDFT(P). X may be the frequency domain data. Thus, $X_i=0$, if $i \in \Phi$ and x=iDFT(X).

According to the SCR-TR algorithm, the location of the largest peak of x is identified, and the index thereof represented by $j \in [LN]$, where L is the oversampling factor. The SCR-TR includes circularly shifting p, $p^j$=circshift(p,j), so that the peaks are aligned. The SCR-TR further includes subtracting the scaled and shifted p from x to obtain:

$$x_{new} = x - \frac{|x(j)| - \mu}{p(0)} p_j e^{j \angle x(j)},$$

where $\mu$ is the target peak, $\angle x(j)$ is the phase of x(j), $i=\sqrt{-1}$. This process is iterated several times to reduce several peaks. The time-domain kernel p looks like a narrow delta if the number of reserved tones is sufficiently large and the locations are chosen properly. Additionally, circularly shifting p in the time-domain does not impact the location of PRTs in the frequency domain—it only disturbs their phase.

In some cases, PRT location selection may be performed by randomly selecting a plurality of PRT indices representing PRT locations, generating an OFDM signal based on the PRTs and the data tones, and determining whether the PAPR of the resulting signal satisfies a PAPR threshold. However, due to the random nature of the PRT selection for each iteration, these methods may introduce unnecessary processing that may create a reduction in performance. Additionally, the selection of the PRTs may not be known by the base station, and thus would need to be signaled to the base station to facilitate decoding by the base station, thereby increasing signaling overhead.

Aspects of techniques and apparatuses described herein may facilitate PRT reservation for reducing PAPR of a power amplifier in a UE. In some aspects, tone reservation techniques described herein may facilitate PRT location determination based on established patterns, sequences, tables, and/or the like. In this way, PRT location may be determined without optimizing random PRT index selection in real time, thereby reducing the complexity of the transmitter's operation. This may facilitate savings in power and time during transmission, thereby improving performance, reducing computational burden, and/or the like.

In some aspects, a base station may allocate a plurality of transmission tones comprising a plurality of data tones and a plurality of PRTs to a UE. The plurality of transmission tones may indicate locations for the plurality of PRTs (a collection of which may be referred to as a plurality of PRT locations) arranged relative to locations for the plurality of data tones (a collection of which may be referred to as a plurality of data tone locations) according to a PRT subsequence of a universal PRT sequence associated with a particular bandwidth. The PRT subsequence may correspond to a sub-band of the bandwidth associated with the resource allocation. In some aspects, UEs may be able to use all of the PRT tones in the universal PRT sequence. In this way, aspects described herein provide a simple PRT selection that facilitates PRT location determination with little processing overhead, signaling overhead, and/or the like. In some aspects, multiple PRT sequences, PRT subsequences, and/or the like may be used and may have varying power constraints. A base station may be able to sweep the PRT sequences and/or instruct a UE to perform rate matching around one or more of the PRT subsequence, PRT sequences, and/or the like. In this way, transmission collisions may be minimized without unnecessary signaling overhead.

Figure 3:
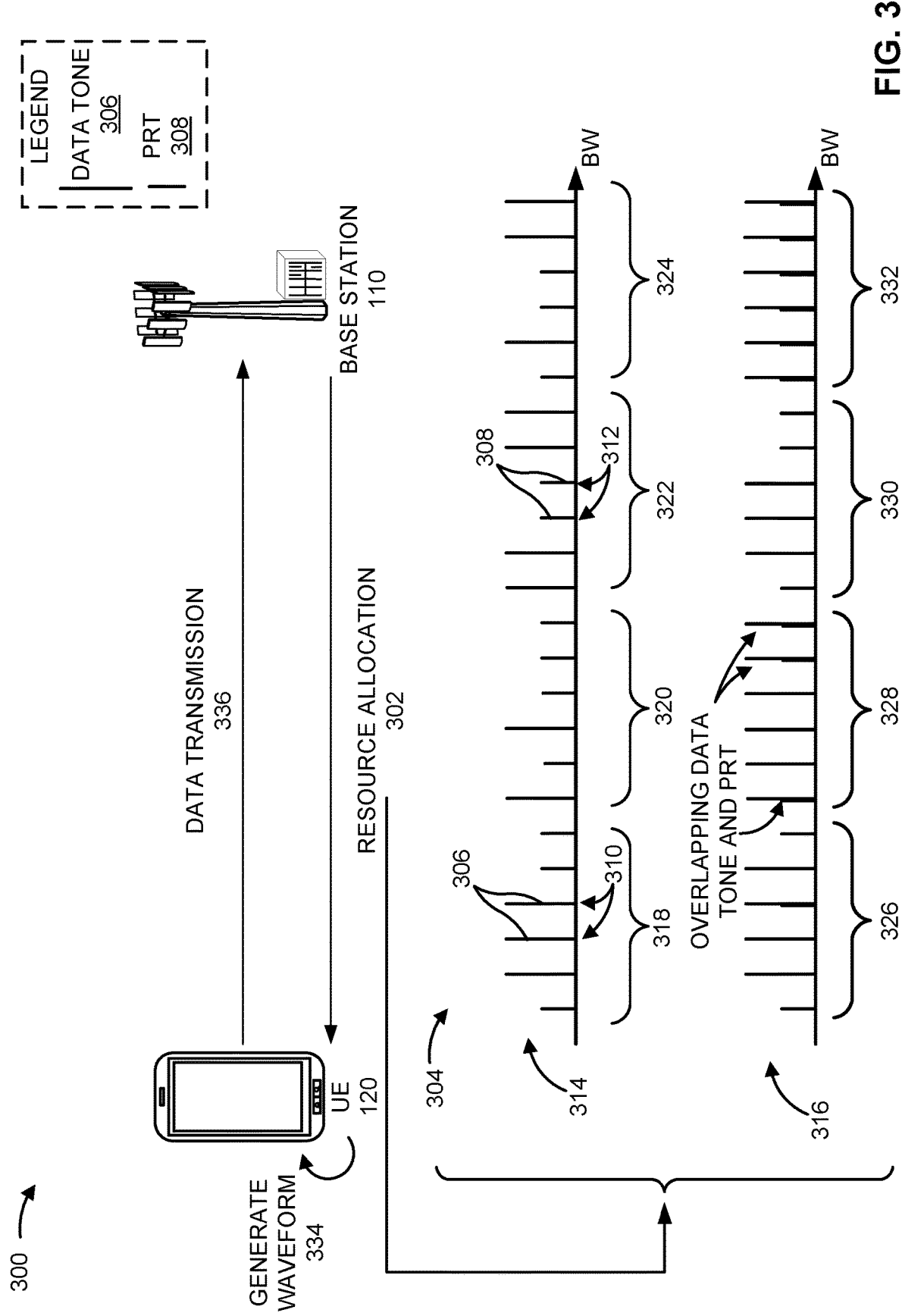
FIG. 3 is a diagram illustrating an example of tone reservation for peak to average power ratio reduction, in accordance the present disclosure.

FIG. 3 is a diagram illustrating an example 300 of tone reservation for peak to average power ratio reduction, in accordance with the present disclosure. As shown, a base station 110 and a UE 120 may communicate with one another.

As shown by reference number 302, the base station 110 may transmit, and the UE 120 may receive, a resource allocation. In some aspects, the resource allocation may be carried in downlink control information (DCI), a radio resource control (RRC) message, a medium access control (MAC)-control element (CE), and/or the like. The resource allocation may indicate a plurality of transmission tones. The set 304 of transmission tones may include a plurality of data tones 306 (shown by the longer vertical bars) and a plurality of PRTs 308 (shown by the shorter vertical bars). The resource allocation may indicate a plurality of data tone locations 310 within a particular bandwidth (shown as "BW"). The resource allocation may indicate a plurality of PRT locations 312 within the particular bandwidth.

In some aspects, the locations for the plurality of PRTs (the plurality of PRT locations) 312 may be arranged relative to the locations for the plurality of data tones (the plurality of data tone locations) 310 according to a universal PRT sequence 314. A universal PRT sequence is a PRT sequence that is used for an entire available bandwidth (e.g., a 100 MHz bandwidth, and/or the like) and is used to allocate PRTs to multiple UEs. Another universal PRT sequence 316 is shown in FIG. 3. In some aspects, any number of universal PRT sequences 314, 316 may be configured for use in tone selection. As shown, the resource allocation may indicate a PRT subsequence 318 of the universal PRT sequence 314. In some aspects, the PRT subsequence 318 corresponds to a sub-band of the particular bandwidth, and is allocated to the UE. Other PRT subsequences 320, 322, and/or 324 of the universal PRT sequence 314 may be allocated to other UEs. In some aspects, each of the PRT subsequences 318, 320, 322, and 324 may be allocated to one of four different UEs 120. In some aspects, each UE of a set of UEs may use all of the PRT subsequences 318, 320, 322, and 324.

In some aspects, the subset of PRTs 308 may include all of the plurality of PRTs 308, and the subset of data tones 306 may include less than all of the plurality of data tones 306. In other words, while the UE 120 may only use the data tones 306 of the allocated sub-band, the UE 120 may use, in some aspects, all of the PRTs 308 in the universal PRT sequence 314 across the bandwidth for PAPR reduction.

In some aspects, the resource allocation may indicate the PRT subsequence 318 by indicating a deterministic function for determining the PRT subsequence 318. In some aspects, the resource allocation may indicate the PRT subsequence 318 by referencing a PRT table (PRTT). In some aspects, the resource allocation may indicate a set of RBs, and the UE 120 may determine, using the PRTT, the PRT subsequence 318 based at least in part on the set of RBs. The PRTT may include a plurality of entries. In some aspects, an entry of the plurality of entries may include the PRT subsequence 318, wherein the PRT subsequence 318 corresponds to a set of RBs, with at least one additional PRT subsequence 320, 322, and/or 324 corresponding to at least one additional set of RBs, one or more parameters of a deterministic function for determining the PRT subsequence 318, and/or the like.

In some aspects, the base station 110 may transmit, and the UE 120 may receive, an indication of a location of the universal PRT sequence 314 relative to a set of allocated RBs. In some aspects, the base station 110 may transmit, and the UE 120 may receive, an indication of a starting location of the universal PRT sequence 314. In some aspects, the starting location of the universal PRT sequence 314 comprises a PRT location 312 associated with an initial PRT 308 of the universal PRT sequence 314.

In some aspects, the indication of the starting location of the universal PRT sequence 314 may indicate the starting location of the universal PRT sequence 314 relative to a center of an initial subcarrier in an initial common RB. In some aspects, the indication of the starting location of the universal PRT sequence 314 may indicate the starting location of the universal PRT sequence 314 by indicating a frequency offset from the center of the initial subcarrier. In some aspects, the indication of the starting location of the universal PRT sequence 314 may indicate the starting location of the universal PRT sequence 314 relative to a synchronization signal block (SSB), wherein the SSB comprises an initial RB of a common RB grid. In some aspects, the indication of the starting location of the universal PRT sequence 314 may be carried in a broadcast message, system information (SI), an RRC message, and/or the like.

As shown by PRT sequence 316, in some aspects, there may be overlap between PRTs 308 and at least some of the data tones 306. For example, in aspects, when bandwidth is scarce, the base station 110 may instruct the UE 120 to transmit on one or more PRTs 308. In this way, efficiency associated with resource allocation may be increased at the expense of some EVM. As shown in connection with a first PRT subsequence 326, there may be partial overlap of data tones 306 and PRTs 308. In some aspects, this partial overlap may introduce some EVM at the receiver (e.g., the base station 110). As shown in connection with a second PRT subsequence 328, there may be a complete overlap of data tones 306 and PRTs 308. In some aspects, this situation may introduce higher EVM than is introduced in connection with the first PRT subsequence 326.

As shown in connection with a third PRT subsequence 330, the subset of PRTs 308 may not overlap the subset of data tones 306. In some aspects, the UE 120 may transmit the data transmission by rate matching around the subset of PRTs 308 associated with the PRT subsequence 330. As shown in connection with a fourth PRT subsequence 332, all of the available transmission tones associated with the corresponding sub-band may be used for both data tones 306 and PRTs 308.

In some aspects, different energy constraints may be associated with different universal PRT sequences 314 and 316, different PRT subsequences 318-332, and/or the like. In some aspects, multiple sets of PRTs 308 may be defined, each having a corresponding energy constraint that is different than each other respective energy constraint. For example, in some aspects, the set 304 of PRTs 308 associated with the first universal PRT sequence 314 may correspond to a first energy constraint, and an additional plurality of PRTs 308 associated with the second universal PRT sequence 316 may correspond to a second energy constraint. Any number, n, of additional sets, $\varphi_1, \varphi_2, \ldots \varphi_n$, of PRTs 308 may be defined, each having a corresponding energy constraint, $P_1, P_2, \ldots P_n$. In some aspects, the UE 120 may use all of the sets, $\varphi_1 \varphi_2, \ldots, \varphi_n$, of PRTs 308 and limit the power of the respective PRTs 308 according to the energy constraints, $P_1, P_2, \ldots, P_n$.

In some aspects, $P_1 > P_2 > \ldots > P_n$. The base station 110 may sweep the allocation of sets, $\varphi_1, \varphi_2, \ldots, \varphi_n$, of PRTs 308 from right to left (e.g., from n to 1) for a UE 120 to also use for data tones, since the sets of PRTs 308 with higher indices have stricter energy constraints and, thus, the data transmissions will experience less interference from the corresponding PRTs 308.

As shown by reference number 334, the UE 120 may generate the waveform based at least in part on the resource allocation. In some aspects, the UE 120 may generate the waveform by determining an inverse discrete Fourier transform of the plurality of transmission tones. In some aspects, the waveform may include a CP-OFDM waveform. In some aspects, the waveform may include a DFT-s-OFDM waveform. In some aspects, the plurality of PRTs may be selected such that a PAPR associated with the waveform satisfies a PAPR threshold.

As shown by reference number 336, the UE 120 may transmit, and the base station 110 may receive, a data transmission using the waveform.

As indicated above, FIG. 3 is provided as an example. Other examples may differ from what is described with respect to FIG. 3.

FIG. 4 is a diagram illustrating an example process 400 performed, for example, by a UE, in accordance with the present disclosure. Example process 400 is an example where the UE (e.g., UE 120 and/or the like) performs operations associated with tone reservation for PAPR reduction.

As shown in FIG. 4, in some aspects, process 400 may include receiving a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth (block 410). For example, the UE (e.g., using receive processor 258, controller/processor 280, memory 282, and/or the like) may receive a resource allocation indicating a plurality of transmission tones comprising a subset of data tones of a plurality of data tones and a subset of PRTs of a plurality of PRTs, as described above. In some aspects, the resource allocation indicates locations for the plurality of data tones and locations for the plurality of PRTs within a particular bandwidth. In some aspects, the locations for the plurality of PRTs are arranged relative to the locations for the plurality of data tones according to a PRT subsequence of a universal PRT sequence. In some aspects, the PRT subsequence corresponds to a sub-band of the particular bandwidth.

As further shown in FIG. 4, in some aspects, process 400 may include transmitting a data transmission using a waveform based at least in part on the resource allocation (block 420). For example, the UE (e.g., using transmit processor 264, controller/processor 280, memory 282, and/or the like) may transmit a data transmission using a waveform based at least in part on the resource allocation, as described above.

Process 400 may include additional aspects, such as any single aspect or any combination of aspects described below and/or in connection with one or more other processes described elsewhere herein.

In a first aspect, process 400 includes generating the waveform by determining an inverse discrete Fourier transform of the plurality of transmission tones.

In a second aspect, alone or in combination with the first aspect, the waveform comprises a CP-OFDM waveform or a DFT-s-OFDM waveform.

In a third aspect, alone or in combination with one or more of the first and second aspects, the resource allocation is carried in at least one of: DCI, an RRC message, a MAC-CE, or a combination thereof.

In a fourth aspect, alone or in combination with one or more of the first through third aspects, the plurality of PRTs are selected such that a PAPR associated with the waveform satisfies a PAPR threshold.

In a fifth aspect, alone or in combination with one or more of the first through fourth aspects, the subset of PRTs comprises all of the plurality of PRTs, and the subset of data tones comprises less than all of the plurality of data tones.

In a sixth aspect, alone or in combination with one or more of the first through fifth aspects, the resource allocation indicates the PRT subsequence by indicating a deterministic function for determining the PRT subsequence.

In a seventh aspect, alone or in combination with one or more of the first through sixth aspects, the resource allocation indicates the PRT subsequence by referencing a PRTT.

In an eighth aspect, alone or in combination with one or more of the first through seventh aspects, the resource allocation indicates a set of RBs, and process 400 further comprises determining, using the PRTT, the PRT subsequence based at least in part on the set of RBs.

In a ninth aspect, alone or in combination with one or more of the first through eighth aspects, the PRTT comprises a plurality of entries, and an entry of the plurality of entries comprises at least one of: the PRT subsequence, wherein the PRT subsequence corresponds to a set of RBs, an additional PRT subsequence corresponding to an additional set of RBs, one or more parameters of a deterministic function for determining the PRT subsequence, or a combination thereof.

In a tenth aspect, alone or in combination with one or more of the first through ninth aspects, process 400 includes receiving an indication of a location of the universal PRT sequence relative to a set of allocated RBs.

In an eleventh aspect, alone or in combination with one or more of the first through tenth aspects, process 400 includes receiving an indication of a starting location of the universal PRT sequence.

In a twelfth aspect, alone or in combination with one or more of the first through eleventh aspects, the starting location of the universal PRT sequence comprises a PRT location associated with an initial PRT of the universal PRT sequence.

In a thirteenth aspect, alone or in combination with one or more of the first through twelfth aspects, the indication of the starting location of the universal PRT sequence indicates the starting location of the universal PRT sequence relative to a center of an initial subcarrier in an initial common resource block.

In a fourteenth aspect, alone or in combination with one or more of the first through thirteenth aspects, the indication of the starting location of the universal PRT sequence indicates the starting location of the universal PRT sequence by indicating a frequency offset from the center of the initial subcarrier.

In a fifteenth aspect, alone or in combination with one or more of the first through fourteenth aspects, the indication of the starting location of the universal PRT sequence indicates the starting location of the universal PRT sequence relative to an SSB, and the SSB comprises an initial RB of a common RB grid.

In a sixteenth aspect, alone or in combination with one or more of the first through fifteenth aspects, the indication of the starting location of the universal PRT sequence is carried in a broadcast message.

In a seventeenth aspect, alone or in combination with one or more of the first through sixteenth aspects, the indication of the starting location of the universal PRT sequence is carried in SI.

In an eighteenth aspect, alone or in combination with one or more of the first through seventeenth aspects, the indication of the starting location of the universal PRT sequence is carried in an RRC message.

In a nineteenth aspect, alone or in combination with one or more of the first through eighteenth aspects, the subset of PRTs does not overlap the subset of data tones, and transmitting the data transmission comprises rate matching around the subset of PRTs.

In a twentieth aspect, alone or in combination with one or more of the first through nineteenth aspects, one or more PRTs of the subset of PRTs comprise data tones.

In a twenty-first aspect, alone or in combination with one or more of the first through twentieth aspects, the resource allocation is based at least in part on an availability of uplink resources.

In a twenty-second aspect, alone or in combination with one or more of the first through twenty-first aspects, the plurality of PRTs corresponds to a first energy constraint, and an additional plurality of PRTs corresponds to a second energy constraint.

In a twenty-third aspect, alone or in combination with one or more of the first through twenty-second aspects, the first energy constraint comprises a first maximum PRT power, and the second energy constraint comprises a second maximum PRT power.

In a twenty-fourth aspect, alone or in combination with one or more of the first through twenty-third aspects, transmitting the data transmission comprises: transmitting the plurality of PRTs using a first PRT power that is no greater than the first maximum PRT power, and transmitting the additional plurality of PRTs using a second PRT power that is no greater than the second maximum PRT power.

In a twenty-fifth aspect, alone or in combination with one or more of the first through twenty-fourth aspects, the second maximum PRT power is greater than the first maximum PRT power, and process 400 further comprises: receiving an additional resource allocation comprising an additional plurality of transmission tones, where the additional plurality of transmission tones comprises the additional plurality of PRTs, and the additional resource allocation is based at least in part on an availability of uplink resources, and transmitting an additional data transmission, after transmitting the data transmission, using an additional waveform based at least in part on the additional resource allocation.

In a twenty-sixth aspect, alone or in combination with one or more of the first through twenty-fifth aspects, at least a third maximum PRT power, corresponding to at least one other plurality of PRTs, is greater than the second maximum PRT power, and process 400 further comprises: receiving at least one other resource allocation comprising at least one other plurality of transmission tones, where the at least one other plurality of transmission tones comprises the at least one other plurality of PRTs, and transmitting at least one other data transmission, after transmitting the additional data transmission, using at least one other waveform based at least in part on the at least one other resource allocation.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
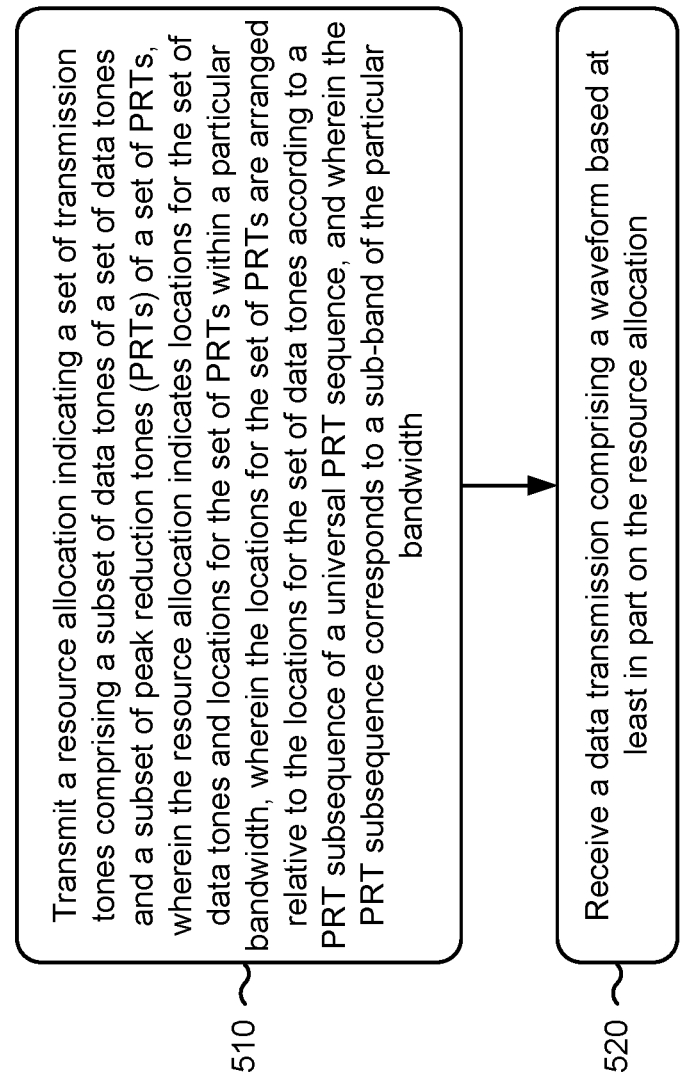
FIG. 5 is a diagram illustrating an example process performed, for example, by a base station, in accordance with of the present disclosure.

FIG. 5 is a diagram illustrating an example process 500 performed, for example, by a base station, in accordance with the present disclosure. Example process 500 is an example where the base station (e.g., base station 110 and/or the like) performs operations associated with tone reservation for PAPR reduction.

As shown in FIG. 5, in some aspects, process 500 may include transmitting a resource allocation indicating a plurality of transmission tones comprising a subset of data tones of a plurality of data tones and a subset of PRTs of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth (block 510). For example, the base station (e.g., using transmit processor 220, controller/processor 240, memory 242, and/or the like) may transmit a resource allocation indicating a plurality of transmission tones comprising a subset of data tones of a plurality of data tones and a subset of PRTs of a plurality of PRTs, as described above. In some aspects, the resource allocation indicates locations for the plurality of data tones and locations for the plurality of PRTs within a particular bandwidth. In some aspects, the resource allocation indicates the locations for the plurality of PRTs within the particular bandwidth. In some aspects, the locations for the plurality of PRTs are arranged relative to the locations for the plurality of data tones according to a PRT subsequence of a universal PRT sequence. In some aspects, the PRT subsequence corresponds to a sub-band of the particular bandwidth.

As further shown in FIG. 5, in some aspects, process 500 may include receiving a data transmission comprising a waveform based at least in part on the resource allocation (block 520). For example, the base station (e.g., using receive processor 238, controller/processor 240, memory 242, and/or the like) may receive a data transmission comprising a waveform based at least in part on the resource allocation, as described above.

Process 500 may include additional aspects, such as any single aspect or any combination of aspects described below and/or in connection with one or more other processes described elsewhere herein.

In a first aspect, the waveform is based at least in part on an inverse discrete Fourier transform of the plurality of transmission tones.

In a second aspect, alone or in combination with the first aspect, the waveform comprises a CP-OFDM waveform or a DFT-s-OFDM waveform.

In a third aspect, alone or in combination with one or more of the first and second aspects, the resource allocation is carried in at least one of: DCI, an RRC message, a MAC-CE, or a combination thereof.

In a fourth aspect, alone or in combination with one or more of the first through third aspects, the plurality of PRTs are selected such that a PAPR associated with the waveform satisfies a PAPR threshold.

In a fifth aspect, alone or in combination with one or more of the first through fourth aspects, the subset of PRTs comprises all of the plurality of PRTs, and the subset of data tones comprises less than all of the plurality of data tones.

In a sixth aspect, alone or in combination with one or more of the first through fifth aspects, the resource allocation indicates the PRT subsequence by indicating a deterministic function for determining the PRT subsequence.

In a seventh aspect, alone or in combination with one or more of the first through sixth aspects, the resource allocation indicates the PRT subsequence by referencing a PRTT.

In an eighth aspect, alone or in combination with one or more of the first through seventh aspects, the resource allocation indicates a set of RBs, and the PRT subsequence is based at least in part on the PRTT and on the set of RBs.

In a ninth aspect, alone or in combination with one or more of the first through eighth aspects, the PRTT comprises a plurality of entries, an entry of the plurality of entries comprises at least one of: the PRT subsequence, wherein the PRT subsequence corresponds to a set of RBs, an additional PRT subsequence corresponding to an additional set of RBs, one or more parameters of a deterministic function for determining the PRT subsequence, or a combination thereof.

In a tenth aspect, alone or in combination with one or more of the first through ninth aspects, process 500 includes transmitting an indication of a location of the universal PRT sequence relative to a set of allocated RBs.

In an eleventh aspect, alone or in combination with one or more of the first through tenth aspects, process 500 includes transmitting an indication of a starting location of the universal PRT sequence.

In a twelfth aspect, alone or in combination with one or more of the first through eleventh aspects, the starting location of the universal PRT sequence comprises a PRT location associated with an initial PRT of the universal PRT sequence.

In a thirteenth aspect, alone or in combination with one or more of the first through twelfth aspects, the indication of the starting location of the universal PRT sequence indicates the starting location of the universal PRT sequence relative to a center of an initial subcarrier in an initial common resource block.

In a fourteenth aspect, alone or in combination with one or more of the first through thirteenth aspects, the indication of the starting location of the universal PRT sequence indicates the starting location of the universal PRT sequence by indicating a frequency offset from the center of the initial subcarrier.

In a fifteenth aspect, alone or in combination with one or more of the first through fourteenth aspects, the indication of the starting location of the universal PRT sequence indicates the starting location of the PRT sequence relative to an SSB, and the SSB comprises an initial RB of a common RB grid.

In a sixteenth aspect, alone or in combination with one or more of the first through fifteenth aspects, the indication of the starting location of the universal PRT sequence is carried in a broadcast message.

In a seventeenth aspect, alone or in combination with one or more of the first through sixteenth aspects, the indication of the starting location of the universal PRT sequence is carried in SI.

In an eighteenth aspect, alone or in combination with one or more of the first through seventeenth aspects, the indication of the starting location of the universal PRT sequence is carried in an RRC message.

In a nineteenth aspect, alone or in combination with one or more of the first through eighteenth aspects, the subset of PRTs does not overlap the subset of data tones, and the data transmission is based at least in part on rate matching around the subset of PRTs.

In a twentieth aspect, alone or in combination with one or more of the first through nineteenth aspects, one or more PRTs of the subset of PRTs comprise data tones.

In a twenty-first aspect, alone or in combination with one or more of the first through twentieth aspects, the resource allocation is based at least in part on an availability of uplink resources.

In a twenty-second aspect, alone or in combination with one or more of the first through twenty-first aspects, the plurality of PRTs corresponds to a first energy constraint, and an additional plurality of PRTs corresponds to a second energy constraint.

In a twenty-third aspect, alone or in combination with one or more of the first through twenty-second aspects, the first energy constraint comprises a first maximum PRT power, and the second energy constraint comprises a second maximum PRT power.

In a twenty-fourth aspect, alone or in combination with one or more of the first through twenty-third aspects, receiving the data transmission comprises: receiving the plurality of PRTs based at least in part on a first PRT power that is no greater than the first maximum PRT power, and receiving the additional plurality of PRTs based at least in part on a second PRT power that is no greater than the second maximum PRT power.

In a twenty-fifth aspect, alone or in combination with one or more of the first through twenty-fourth aspects, the second maximum PRT power is greater than the first maximum PRT power, and process 500 further comprises: transmitting an additional resource allocation comprising an additional plurality of transmission tones, where the additional plurality of transmission tones comprises the additional plurality of PRTs, and the additional resource allocation is based at least in part on an availability of uplink resources, and receiving an additional data transmission, after receiving the data transmission, comprising an additional waveform based at least in part on the additional resource allocation.

In a twenty-sixth aspect, alone or in combination with one or more of the first through twenty-fifth aspects, at least a third maximum PRT power, corresponding to at least one other plurality of PRTs, is greater than the second maximum PRT power, and process 500 further comprises: transmitting at least one other resource allocation comprising at least one other plurality of transmission tones, where the at least one other plurality of transmission tones comprises the at least one other plurality of PRTs, and receiving at least one other data transmission, after receiving the additional data transmission, comprising at least one other waveform based at least in part on the at least one other resource allocation.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and transmitting a data transmission using a waveform based at least in part on the resource allocation.

Aspect 2: The method of Aspect 1, further comprising generating the waveform by determining an inverse discrete Fourier transform of the plurality of transmission tones.

Aspect 3: The method of either of Aspects 1 or 2, wherein the waveform comprises a cyclic prefix orthogonal frequency division multiplexing (OFDM) waveform or a discrete Fourier transform spread OFDM waveform.

Aspect 4: The method of any of Aspects 1-3, wherein the resource allocation is carried in at least one of: downlink control information, a radio resource control message, a medium access control control element, or a combination thereof.

Aspect 5: The method of any of Aspects 1-4, wherein the plurality of PRTs are selected such that a peak to average power ratio (PAPR) associated with the waveform satisfies a PAPR threshold.

Aspect 6: The method of any of Aspects 1-5, wherein the subset of PRTs comprises all of the plurality of PRTs, and wherein the subset of data tones comprises less than all of the plurality of data tones.

Aspect 7: The method of any of Aspects 1-6, wherein the resource allocation indicates the PRT subsequence by indicating a deterministic function for determining the PRT subsequence.

Aspect 8: The method of any of Aspects 1-7, wherein the resource allocation indicates the PRT subsequence by referencing a PRT table (PRTT).

Aspect 9: The method of Aspect 8, wherein the resource allocation indicates a set of resource blocks (RBs), and the method further comprising determining, using the PRTT, the PRT subsequence based at least in part on the set of RBs.

Aspect 10: The method of either of Aspects 8 or 9, wherein the PRTT comprises a plurality of entries, wherein an entry of the plurality of entries comprises at least one of: the PRT subsequence, wherein the PRT subsequence corresponds to a set of resource blocks (RBs), an additional PRT subsequence corresponding to an additional set of RBs, one or more parameters of a deterministic function for determining the PRT subsequence, or a combination thereof.

Aspect 11: The method of any of Aspects 1-10, further comprising receiving an indication of a location of the universal PRT sequence relative to a set of allocated resource blocks (RBs).

Aspect 12: The method of any of Aspects 1-11, further comprising receiving an indication of a starting location of the universal PRT sequence.

Aspect 13: The method of Aspect 12, wherein the starting location of the universal PRT sequence comprises a PRT location associated with an initial PRT of the universal PRT sequence.

Aspect 14: The method of Aspect 13, wherein the indication of the starting location of the universal PRT sequence indicates the starting location of the universal PRT sequence relative to a center of an initial subcarrier in an initial common resource block.

Aspect 15: The method of Aspect 14, wherein the indication of the starting location of the universal PRT sequence indicates the starting location of the universal PRT sequence by indicating a frequency offset from the center of the initial subcarrier.

Aspect 16: The method of any of Aspects 12-15, wherein the indication of the starting location of the universal PRT sequence indicates the starting location of the universal PRT sequence relative to a synchronization signal block (SSB), wherein the SSB comprises an initial resource block (RB) of a common RB grid.

Aspect 17: The method of any of Aspects 12-16, wherein the indication of the starting location of the universal PRT sequence is carried in a broadcast message.

Aspect 18: The method of any of Aspects 12-17, wherein the indication of the starting location of the universal PRT sequence is carried in system information.

Aspect 19: The method of any of Aspects 12-18, wherein the indication of the starting location of the universal PRT sequence is carried in a radio resource control message.

Aspect 20: The method of any of Aspects 1-19, wherein the subset of PRTs does not overlap the subset of data tones, and wherein transmitting the data transmission comprises rate matching around the subset of PRTs.

Aspect 21: The method of any of Aspects 1-20, wherein one or more PRTs of the subset of PRTs comprise data tones.

Aspect 22: The method of any of Aspects 1-21, wherein the resource allocation is based at least in part on an availability of uplink resources.

Aspect 23: The method of any of Aspects 1-22, wherein the plurality of PRTs corresponds to a first energy constraint, and wherein an additional plurality of PRTs corresponds to a second energy constraint.

Aspect 24: The method of Aspect 23, wherein the first energy constraint comprises a first maximum PRT power, and wherein the second energy constraint comprises a second maximum PRT power.

Aspect 25: The method of Aspect 24, wherein transmitting the data transmission comprises: transmitting the plurality of PRTs using a first PRT power that is no greater than the first maximum PRT power; and transmitting the additional plurality of PRTs using a second PRT power that is no greater than the second maximum PRT power.

Aspect 26: The method of Aspect 25, wherein the second maximum PRT power is greater than the first maximum PRT power, the method further comprising: receiving an additional resource allocation comprising an additional plurality of transmission tones, wherein the additional plurality of transmission tones comprises the additional plurality of PRTs, and wherein the additional resource allocation is based at least in part on an availability of uplink resources; and transmitting an additional data transmission, after transmitting the data transmission, using an additional waveform based at least in part on the additional resource allocation.

Aspect 27: The method of Aspect 26, wherein at least a third maximum PRT power, corresponding to at least one other plurality of PRTs, is greater than the second maximum PRT power, the method further comprising: receiving at least one other resource allocation comprising at least one other plurality of transmission tones, wherein the at least one other plurality of transmission tones comprises the at least one other plurality of PRTs; and transmitting at least one other data transmission, after transmitting the additional data transmission, using at least one other waveform based at least in part on the at least one other resource allocation.

Aspect 28: A method of wireless communication performed by a base station, comprising: transmitting a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and receiving a data transmission comprising a waveform based at least in part on the resource allocation.

Aspect 29: The method of Aspect 28, wherein the waveform is based at least in part on an inverse discrete Fourier transform of the plurality of transmission tones.

Aspect 30: The method of Aspect 29, wherein the waveform comprises a cyclic prefix orthogonal frequency division multiplexing (OFDM) waveform or a discrete Fourier transform spread OFDM waveform.

Aspect 31: The method of any of Aspects 28-30, wherein the resource allocation is carried in at least one of: downlink control information, a radio resource control message, a medium access control control element, or a combination thereof.

Aspect 32: The method of any of Aspects 28-31, wherein the plurality of PRTs are selected such that a peak to average power ratio (PAPR) associated with the waveform satisfies a PAPR threshold.

Aspect 33: The method of any of Aspects 28-32, wherein the subset of PRTs comprises all of the plurality of PRTs, and wherein the subset of data tones comprises less than all of the plurality of data tones.

Aspect 34: The method of any of Aspects 28-33, wherein the resource allocation indicates the PRT subsequence by indicating a deterministic function for determining the PRT subsequence.

Aspect 35: The method of any of Aspects 28-34, wherein the resource allocation indicates the PRT subsequence by referencing a PRT table (PRTT).

Aspect 36: The method of Aspect 35, wherein the resource allocation indicates a set of resource blocks (RBs), and wherein the PRT subsequence is based at least in part on the PRTT and on the set of RBs.

Aspect 37: The method of either of Aspects 35 or 36, wherein the PRTT comprises a plurality of entries, wherein an entry of the plurality of entries comprises at least one of: the PRT subsequence, wherein the PRT subsequence corresponds to a set of resource blocks (RBs), an additional PRT subsequence corresponding to an additional set of RBs, one or more parameters of a deterministic function for determining the PRT subsequence, or a combination thereof.

Aspect 38: The method of any of Aspects 28-37, further comprising transmitting an indication of a location of the universal PRT sequence relative to a set of allocated resource blocks (RBs).

Aspect 39: The method of any of Aspects 28-38, further comprising transmitting an indication of a starting location of the universal PRT sequence.

Aspect 40: The method of Aspect 39, wherein the starting location of the universal PRT sequence comprises a PRT location associated with an initial PRT of the universal PRT sequence.

Aspect 41: The method of either of Aspects 39 or 40, wherein the indication of the starting location of the universal PRT sequence indicates the starting location of the universal PRT sequence relative to a center of an initial subcarrier in an initial common resource block.

Aspect 42: The method of Aspect 41, wherein the indication of the starting location of the universal PRT sequence indicates the starting location of the universal PRT sequence by indicating a frequency offset from the center of the initial subcarrier.

Aspect 43: The method of any of Aspects 39-42, wherein the indication of the starting location of the universal PRT sequence indicates the starting location of the PRT sequence relative to a synchronization signal block (SSB), wherein the SSB comprises an initial resource block (RB) of a common RB grid.

Aspect 44: The method of any of Aspects 39-43, wherein the indication of the starting location of the universal PRT sequence is carried in a broadcast message.

Aspect 45: The method of any of Aspects 39-44, wherein the indication of the starting location of the universal PRT sequence is carried in system information.

Aspect 46: The method of any of Aspects 39-45, wherein the indication of the starting location of the universal PRT sequence is carried in a radio resource control message.

Aspect 47: The method of any of Aspects 28-46, wherein the subset of PRTs does not overlap the subset of data tones, and wherein the data transmission is based at least in part on rate matching around the subset of PRTs.

Aspect 48: The method of any of Aspects 28-47, wherein one or more PRTs of the subset of PRTs comprise data tones.

Aspect 49: The method of any of Aspects 28-48, wherein the resource allocation is based at least in part on an availability of uplink resources.

Aspect 50: The method of any of Aspects 28-49, wherein the plurality of PRTs corresponds to a first energy constraint, and wherein an additional plurality of PRTs corresponds to a second energy constraint.

Aspect 51: The method of Aspect 50, wherein the first energy constraint comprises a first maximum PRT power, and wherein the second energy constraint comprises a second maximum PRT power.

Aspect 52: The method of Aspect 51, wherein receiving the data transmission comprises: receiving the plurality of PRTs based at least in part on a first PRT power that is no greater than the first maximum PRT power; and receiving the additional plurality of PRTs based at least in part on a second PRT power that is no greater than the second maximum PRT power.

Aspect 53: The method of Aspect 52, wherein the second maximum PRT power is greater than the first maximum PRT power, the method further comprising: transmitting an additional resource allocation comprising an additional plurality of transmission tones, wherein the additional plurality of transmission tones comprises the additional plurality of PRTs, and wherein the additional resource allocation is based at least in part on an availability of uplink resources; and receiving an additional data transmission, after receiving the data transmission, comprising an additional waveform based at least in part on the additional resource allocation.

Aspect 54: The method of Aspect 53, wherein at least a third maximum PRT power, corresponding to at least one other plurality of PRTs, is greater than the second maximum PRT power, the method further comprising: transmitting at least one other resource allocation comprising at least one other plurality of transmission tones, wherein the at least one other plurality of transmission tones comprises the at least one other plurality of PRTs; and receiving at least one other data transmission, after receiving the additional data transmission, comprising at least one other waveform based at least in part on the at least one other resource allocation.

Aspect 55: An apparatus for wireless communication at a device, comprising a processor; memory coupled with the processor; and instructions stored in the memory and executable by the processor to cause the apparatus to perform the method of one or more of Aspects 1-27.

Aspect 56: A device for wireless communication, comprising a memory and one or more processors coupled to the memory, the memory and the one or more processors configured to perform the method of one or more of Aspects 1-27.

Aspect 57: An apparatus for wireless communication, comprising at least one means for performing the method of one or more of Aspects 1-27.

Aspect 58: A non-transitory computer-readable medium storing code for wireless communication, the code comprising instructions executable by a processor to perform the method of one or more of Aspects 1-27.

Aspect 59: A non-transitory computer-readable medium storing a set of instructions for wireless communication, the set of instructions comprising one or more instructions that, when executed by one or more processors of a device, cause the device to perform the method of one or more of Aspects 1-27.

Aspect 60: An apparatus for wireless communication at a device, comprising a processor; memory coupled with the processor; and instructions stored in the memory and executable by the processor to cause the apparatus to perform the method of one or more of Aspects 28-54.

Aspect 61: A device for wireless communication, comprising a memory and one or more processors coupled to the memory, the memory and the one or more processors configured to perform the method of one or more of Aspects 28-54.

Aspect 62: An apparatus for wireless communication, comprising at least one means for performing the method of one or more of Aspects 28-54.

Aspect 63: A non-transitory computer-readable medium storing code for wireless communication, the code comprising instructions executable by a processor to perform the method of one or more of Aspects 28-54.

Aspect 64: A non-transitory computer-readable medium storing a set of instructions for wireless communication, the set of instructions comprising one or more instructions that, when executed by one or more processors of a device, cause the device to perform the method of one or more of Aspects 28-54.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and
transmit a data transmission using a waveform based at least in part on the resource allocation.

2. The UE of claim 1, wherein the one or more processors are further configured to generate the waveform by determining an inverse discrete Fourier transform of the plurality of transmission tones.

3. The UE of claim 1, wherein the waveform comprises a cyclic prefix orthogonal frequency division multiplexing (OFDM) waveform or a discrete Fourier transform spread OFDM waveform.

4. The UE of claim 1, wherein the resource allocation is carried in at least one of:
downlink control information,
a radio resource control message,
a medium access control control element, or
a combination thereof.

5. The UE of claim 1, wherein the plurality of PRTs are selected such that a peak to average power ratio (PAPR) associated with the waveform satisfies a PAPR threshold.

6. The UE of claim 1, wherein the subset of PRTs comprises all of the plurality of PRTs, and wherein the subset of data tones comprises less than all of the plurality of data tones.

7. The UE of claim 1, wherein the resource allocation indicates the PRT subsequence by indicating a deterministic function for determining the PRT subsequence.

8. The UE of claim 1, wherein the resource allocation indicates the PRT subsequence by referencing a PRT table (PRTT).

9. The UE of claim 8, wherein the resource allocation indicates a set of resource blocks (RBs), and
the method further comprising determining, using the PRTT, the PRT subsequence based at least in part on the set of RBs.

10. The UE of claim 8, wherein the PRTT comprises a plurality of entries, wherein an entry of the plurality of entries comprises at least one of:
the PRT subsequence, wherein the PRT subsequence corresponds to a set of resource blocks (RBs),
an additional PRT subsequence corresponding to an additional set of RBs,
one or more parameters of a deterministic function for determining the PRT subsequence, or
a combination thereof.

11. The UE of claim 1, wherein the one or more processors are further configured to receive an indication of a location of the universal PRT sequence relative to a set of allocated resource blocks (RBs).

12. The UE of claim 1, wherein the one or more processors are further configured to receive an indication of a starting location of the universal PRT sequence.

13. The UE of claim 12, wherein the starting location of the universal PRT sequence comprises a PRT location associated with an initial PRT of the universal PRT sequence.

14. The UE of claim 13, wherein the indication of the starting location of the universal PRT sequence indicates the starting location of the universal PRT sequence relative to a center of an initial subcarrier in an initial common resource block.

15. The UE of claim 14, wherein the indication of the starting location of the universal PRT sequence indicates the starting location of the universal PRT sequence by indicating a frequency offset from the center of the initial subcarrier.

16. The UE of claim 12, wherein the indication of the starting location of the universal PRT sequence indicates the starting location of the universal PRT sequence relative to a synchronization signal block (SSB), wherein the SSB comprises an initial resource block (RB) of a common RB grid.

17. The UE of claim 12, wherein the indication of the starting location of the universal PRT sequence is carried in a broadcast message.

18. The UE of claim 12, wherein the indication of the starting location of the universal PRT sequence is carried in system information.

19. The UE of claim 12, wherein the indication of the starting location of the universal PRT sequence is carried in a radio resource control message.

20. The UE of claim 1, wherein the subset of PRTs does not overlap the subset of data tones, and
wherein the one or more processors, to transmit the data transmission, are configured to rate matching around the subset of PRTs.

21. The UE of claim 1, wherein one or more PRTs of the subset of PRTs comprise data tones.

22. The UE of claim 1, wherein the resource allocation is based at least in part on an availability of uplink resources.

23. The UE of claim 1, wherein the plurality of PRTs corresponds to a first energy constraint, and wherein an additional plurality of PRTs corresponds to a second energy constraint.

24. The UE of claim 23, wherein the first energy constraint comprises a first maximum PRT power, and wherein the second energy constraint comprises a second maximum PRT power.

25. The UE of claim 24, wherein the one or more processors, to transmit the data transmission, are configured to:
   transmit the plurality of PRTs using a first PRT power that is no greater than the first maximum PRT power; and
   transmit the additional plurality of PRTs using a second PRT power that is no greater than the second maximum PRT power.

26. The UE of claim 25, wherein the second maximum PRT power is greater than the first maximum PRT power, the method further comprising:
   receive an additional resource allocation comprising an additional plurality of transmission tones, wherein the additional plurality of transmission tones comprises the additional plurality of PRTs, and wherein the additional resource allocation is based at least in part on an availability of uplink resources; and
   transmit an additional data transmission, after transmitting the data transmission, using an additional waveform based at least in part on the additional resource allocation.

27. The UE of claim 25, wherein at least a third maximum PRT power, corresponding to at least one other plurality of PRTs, is greater than the second maximum PRT power, the method further comprising:
   receive at least one other resource allocation comprising at least one other plurality of transmission tones, wherein the at least one other plurality of transmission tones comprises the at least one other plurality of PRTs; and
   transmit at least one other data transmission, after transmitting the additional data transmission, using at least one other waveform based at least in part on the at least one other resource allocation.

28. A base station for wireless communication, comprising:
   a memory; and
   one or more processors, coupled to the memory, configured to:
      transmit a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and
      receive a data transmission comprising a waveform based at least in part on the resource allocation.

29. A method of wireless communication performed by a user equipment (UE), comprising:
   receiving a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and
   transmitting a data transmission using a waveform based at least in part on the resource allocation.

30. A method of wireless communication performed by a base station, comprising:
   transmitting a resource allocation indicating a plurality of transmission tones comprising a subset of data tones of a plurality of data tones and a subset of peak reduction tones (PRTs) of a plurality of PRTs, wherein the resource allocation indicates locations for the plurality of data tones and locations for the plurality of PRTs within a particular bandwidth, wherein the locations for the plurality of PRTs are arranged relative to the locations for the plurality of data tones according to a PRT subsequence of a universal PRT sequence, and wherein the PRT subsequence corresponds to a sub-band of the particular bandwidth; and
   receiving a data transmission comprising a waveform based at least in part on the resource allocation.

* * * * *